United States Patent [19]
Tomlinson, Jr. et al.

[11] 3,729,230
[45] Apr. 24, 1973

[54] DIVIDED BODY FOR DUMP TRUCKS

[76] Inventors: George A. Tomlinson, Jr.; Tommie J. Long; Gene C. Galloway, all of Tulsa, Okla.

[73] Assignee: Unit Rig and Equipment Company, Tulsa, Okla.

[22] Filed: Aug. 3, 1970

[21] Appl. No.: 60,504

[52] U.S. Cl. ..................... 298/7, 298/17, 296/28 D
[51] Int. Cl. ............................................. B60p 1/28
[58] Field of Search ........................... 298/7, 8, 17;
105/261, 279; 276/176, 564; 214/508, 17 B,
17 R, 17 C, 41, 14; 296/51, 28 D; 193/2, 31,
32, 4

[56] References Cited

UNITED STATES PATENTS

| 750,628 | 1/1904 | Fay | 193/32 |
|---|---|---|---|
| 875,447 | 12/1907 | Miley | 193/4 |
| 2,465,899 | 3/1949 | Maxon | 298/17 R |
| 2,613,106 | 10/1952 | Maxon | 298/17 R |

FOREIGN PATENTS OR APPLICATIONS

| 137,357 | 5/1950 | Australia | 298/7 |

*Primary Examiner*—Richard J. Johnson
*Attorney*—William S. Dorman

[57] ABSTRACT

A divided dump body for a dump truck particularly designed and constructed whereby the entire load from a single dump body may be loaded into a single receiving vessel or container in a manner wherein the load is substantially evenly distributed in the container, thus eliminating the need for intermediate loading vehicles or devices.

3 Claims, 5 Drawing Figures

Patented April 24, 1973  3,729,230

INVENTORS
GEORGE A. TOMLINSON
TOMMIE J. LONG
GENE C. GALLOWAY

BY

William S. Dorman

ATTORNEY

INVENTORS
GEORGE A. TOMLINSON
TOMMIE J. LONG
GENE C. GALLOWAY

BY William S. Dorman
ATTORNEY

DIVIDED BODY FOR DUMP TRUCKS

This invention relates to improvements in dump trucks and more particularly, but not by way of limitation, to a divided dump body for a dump truck.

There are certain requirements wherein it is considered advantageous for the dump body of a dump truck to hold a quantity of material exactly equal to the quantity of material which can be contained in the receiving container. For example, in loading material onto a railway gondola it has been necessary in the past to load the material from the large initial carrier onto smaller carts, and the smaller carts moved to the gondola for depositing of the material thereon. In order to overcome this disadvantage a dump truck having a dump body particularly designed for containing the same quantity of material as the gondola has been developed to eliminate the need for intermediate loading and unloading operations. However, when the conventional dump body discharges a load of material, the material is normally deposited in a single conical shaped pile, and the dumping of an entire load into a single container, such as a railway gondola, results in loss of material from the container through spillage, in addition to which the material is not remotely spread out over the volume of the railway car.

The present invention contemplates a novel dump body for a dump truck particularly constructed for overcoming this difficulty. A geometrical figure is secured in the proximity of the center of the dumping edge of the dump body and the discharging material is efficiently diverted at the dumping point to discharge the load in two substantially equal conical piles which do not overflow the receiving container. This results in a substantially equal loading of the container. The novel dump body is simple and efficient in operation and economical and durable in construction.

It is an important object of this invention to provide a novel dump truck having a load capacity substantially equal to the volume of the load receiving vessel or container.

It is another object of this invention to provide a novel dump body for a dump truck particularly designed and constructed for discharging material therefrom in a manner for substantially equal loading of the container.

Other and further objects and advantageous features of the present invention will hereinafter more fully appear in connection with a detailed description of the drawings in which.

Figure 1:
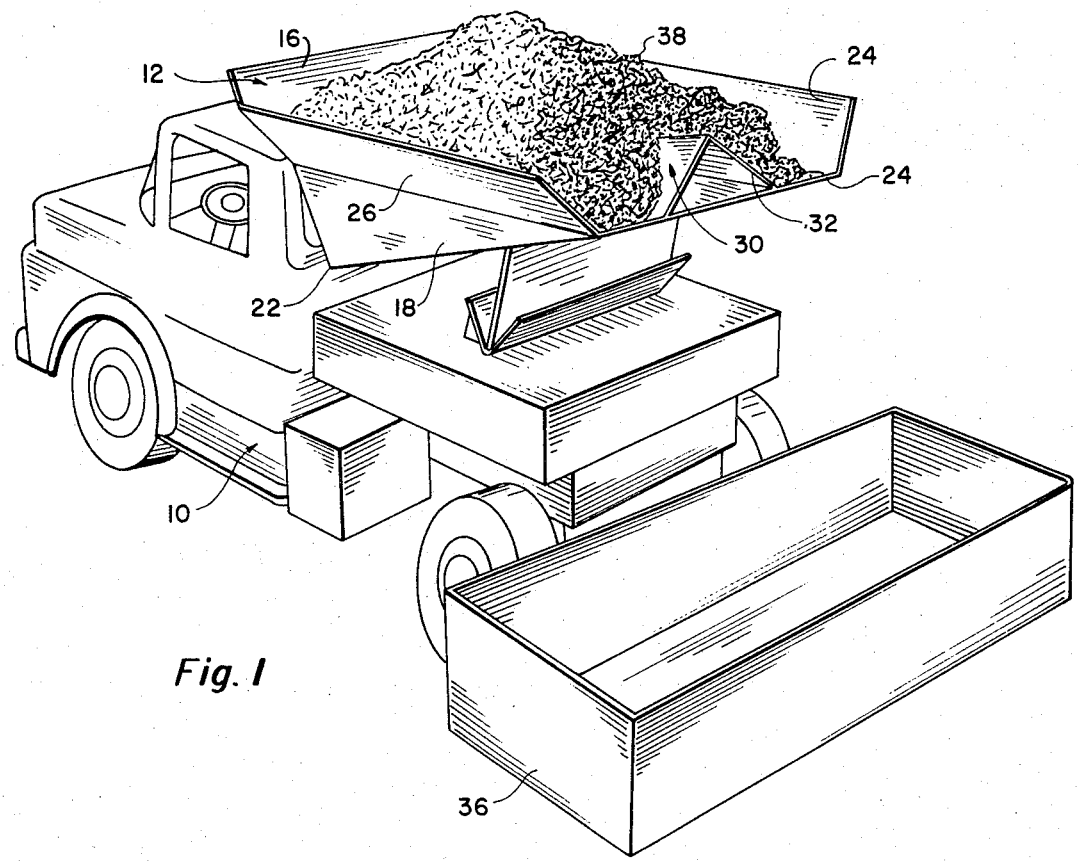
FIG. 1 is a perspective view of a dump truck embodying the invention and depicted in a loading position with respect to a load receiving container.
Figure 2:
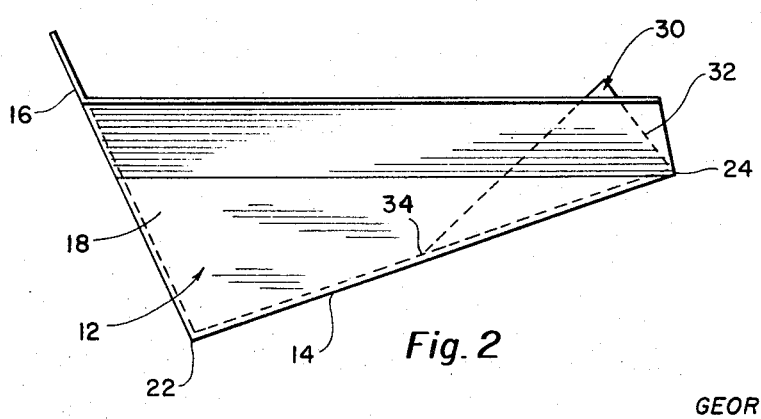
FIG. 2 is a side elevational view of a dump body embodying the invention with portions thereof depicted in dotted lines for purposes of illustration.
Figure 3:
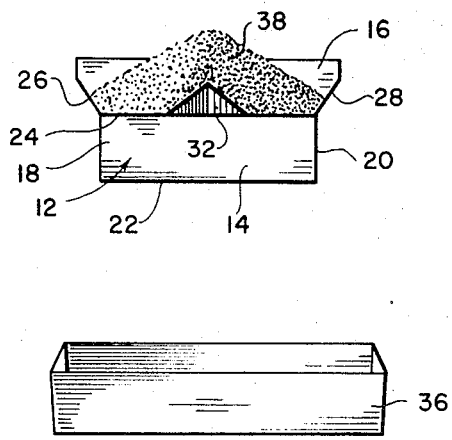
FIG. 3 is a rear view of a dump body embodying the invention and depicted in position prior to an unloading operation.

Referring to the drawings in detail, reference character 10 generally indicates a dump truck of any suitable type having a pivotal dump body 12 provided thereon. The body 12 may be of any desired construction and as depicted herein comprises a bottom plate 14 having a front sidewall 16 and a pair of opposed sidewalls 18 and 20. The bottom 14 and front sidewall 16 are preferably arranged in such a manner that the juncture 22 therebetween is at a lower position than the outer end or dumping edge 24 of the bottom 14 when the dump body 12 is in the normal traveling or loaded position thereof as shown in FIGS. 1, 2 and 3. The sidewalls 18 and 20 preferably extend substantially perpendicular to the bottom plate 14 at the lower portions thereof and are flared outwardly at the upper ends thereof as shown at 26 and 28, respectively. Of course, the configuration of the dump body 12 is not limited to that shown herein, but may be of any suitable construction as is well known.

A substantially pyramid-shaped divider member 30 is secured to the bottom plate 14 adjacent the dumping edge 24 thereof in any suitable manner (not shown), and is substantially centrally disposed between the sidewalls 18 and 20. The enlarged end 32 of the divider 30 is preferably disposed in substantial alignment with the rear or open dumping edge 24 of the bottom plate 14 and the tapered or small end 34 thereof extends along the longitudinal centerline of the bottom 14 in a direction toward the front wall 16, and through a distance approximately half the length of the body 12, but not limited thereto. The divider 30 extends upwardly from the bottom 14 a sufficient distance for dividing the flow of material therefrom in a manner as will be hereinafter set forth and as clearly shown in the drawings. It is also to be noted that whereas the pyramid configuration of the divider 30 is preferred, it is anticipated that other geometrical configurations may be utilized in lieu thereof.

Figure 4:
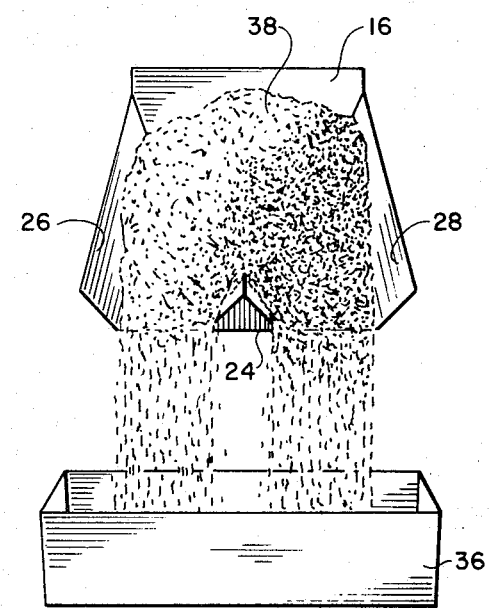
FIG. 4 is a view similar to FIG. 3 but showing the dump body during an unloading operation.
Figure 5:
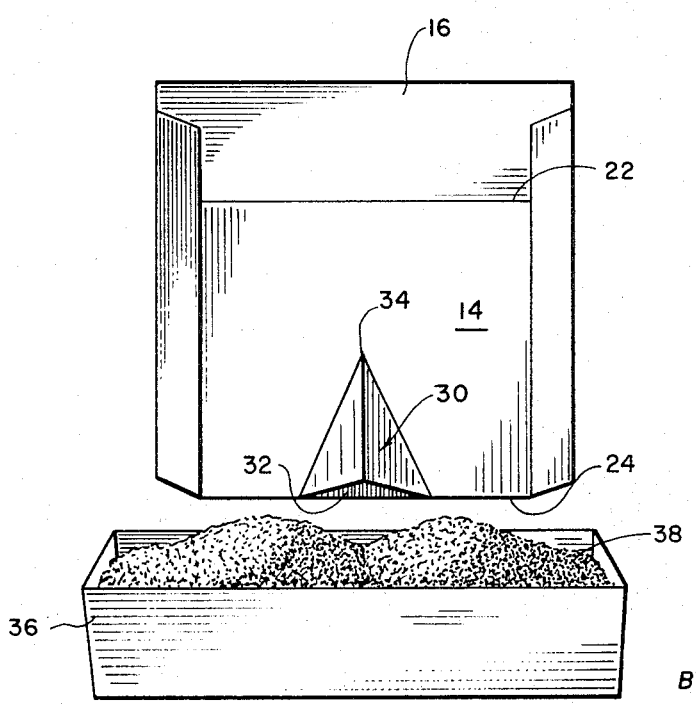
FIG. 5 is a view similar to FIG. 4 showing the dump body and receiving container subsequent to unloading of the dump body.

The volumetric content of the dump body 12 is substantially identical with the volumetric content of a container 36, which may be a railway gondola car, or the like, but not limited thereto. The body 12 is filled with material 38 in the usual manner (not shown) and is transported by the vehicle 10 with the dump body in the travelling position, as shown in FIG. 1, to the site of the container 36. The dump body 12 is then pivoted for unloading or dumping of the material 38 in the usual or well known manner. The material 38 is discharged from the body 12 around the divider 30 in two separate flowing streams, as clearly shown in FIG. 4. This results in the depositing of the material in the container 36 in two substantially even piles or stacks whereby the material 38 is substantially evenly distributed throughout the length of the container 36, as clearly shown in FIG. 5. The material may thus be loaded into the container 36 in a single operation with little or no spillage of the material during the loading operation.

From the foregoing it will be apparent that the present invention contemplates a novel dump truck having a divided dump body for facilitating the loading of relatively large quantities of material into a single container in a single dumping or unloading operation. The dump body is provided with a novel divider member which separates the material being unloaded therefrom into two separate streams in a manner for delivery of the material in a substantially even distribution throughout the length of the container. The novel dump truck body substantially eliminates accidental spillage of the material from the container during the unloading operation, thus improving the efficiency of the dumping operation.

Of course, a plurality of divider members may be spaced along the dumping edge of the body if desired, for separating the flow of the material into a plurality of separate flow streams, rather than the single divider and two flow streams depicted herein.

Whereas the present invention has been described in particular relation to the drawings attached hereto, it should be understood that other and further modifications, apart from those shown or suggested herein, may be made within the spirit and scope of this invention.

What is claimed is:

1. In combination with a dump truck, a dump body pivotally secured to the truck, divider means secured to the dump body, said divider means being disposed on the body for dividing the flow of material being discharged therefrom into individual flow streams for even distribution thereof into a receiving container and wherein the divider means includes a divider element secured to the longitudinal center line of the dump body and extending therealong for diverting the flow of the material being discharged therefrom into substantially identical flow streams and wherein the divider element is substantially pyramid shaped having an enlarged base portion and a substantially smaller apex portion, the enlarged base portion of the pyramid shaped divider element being disposed in substantial alignment with the rear edge of the dump body, and the smaller apex portion thereof extending in a direction toward the front of the dump body and to a point spaced from the front of the dump body.

2. In combination with a dump truck, a dump body pivotally secured to the truck and having a bottom plate, a front wall secured to the bottom plate, opposed sidewalls secured to the bottom plate, said bottom plate having an open rearwardly disposed edge, divider means secured to the bottom plate and extending along the longitudinal center line thereof for dividing the flow of material thereof into separate flow streams during discharge of material from the dump body, the said divider means including a divider element of substantially pyramid shape having an enlarged base portion and a substantially smaller apex portion, the enlarged base portion thereof being disposed in substantial alignment with the open rear edge of the bottom plate, and the smaller apex portion thereof extending along the longitudinal center thereof in a direction toward the front wall.

3. In combination with a dump truck, a dump body pivotally secured to the truck, divider means secured to the dump body, said divider means including a divider element secured to the longitudinal center line of the dump body and extending from the rear edge of the dump body to a point spaced from the front of the dump body for dividing the flow of material being discharged therefrom as the said material encounters the divider near the rear of the dump body into individual flow streams for even distribution thereof into a receiving container, the said divider means including a divider element secured to the longitudinal center line of the dump body and extending therealong for diverting the flow of the material being discharged therefrom into two substantially identical flow streams, the said divider element being substantially pyramid shaped having an enlarged base portion and a substantially smaller apex portion, the enlarged base portion being disposed in substantial alignment with the rear edge of the dump body, and the smaller apex portion of the said divider element extending in a direction toward the front of the dump body.

* * * * *